Nov. 14, 1933.  E. KNAPP ET AL  1,934,718
DUSTING MACHINE
Original Filed May 19, 1928  2 Sheets-Sheet 1
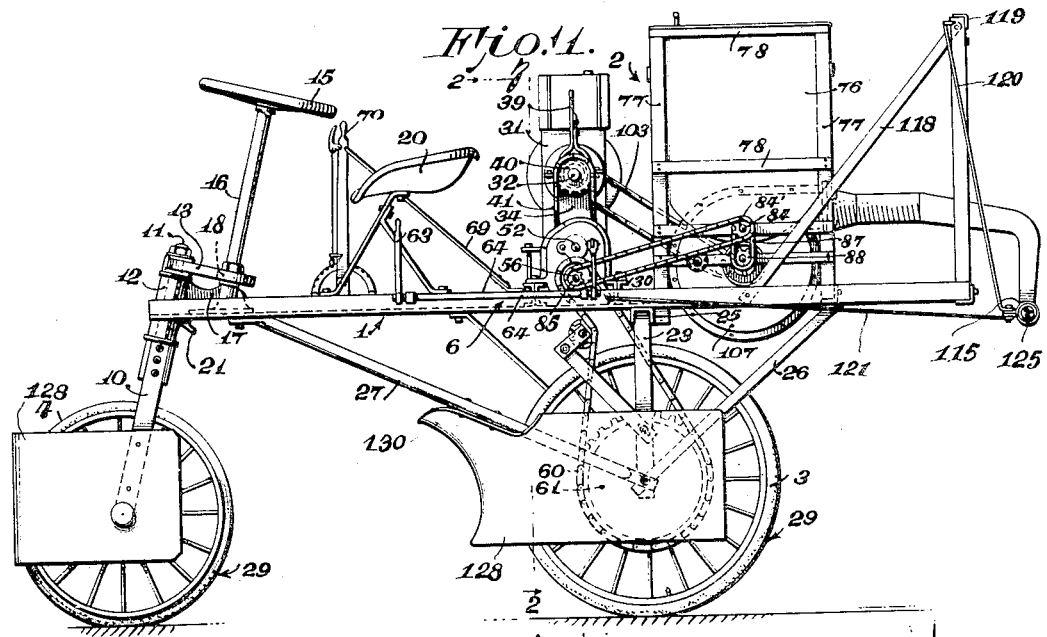
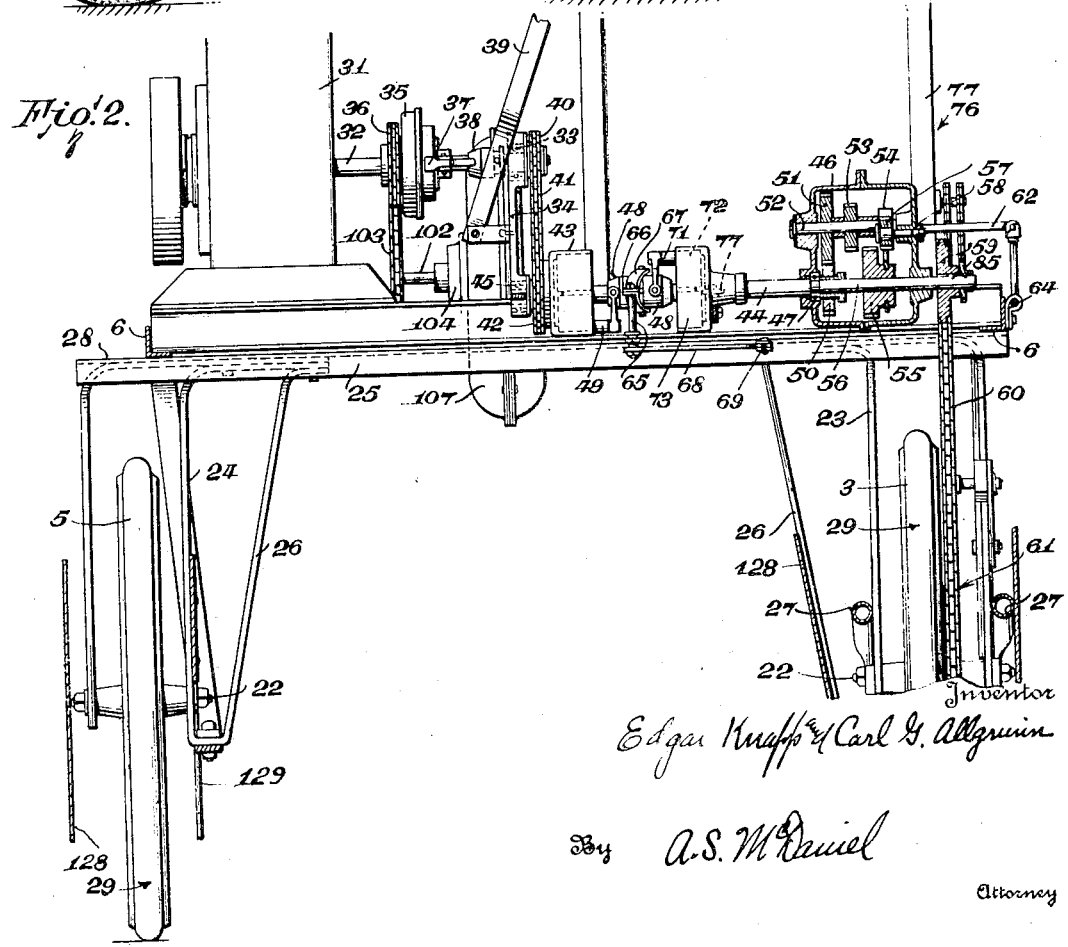
Inventor
Edgar Knapp & Carl G. Allgruin
By A. S. McDaniel
Attorney Nov. 14, 1933.   E. KNAPP ET AL   1,934,718
DUSTING MACHINE
Original Filed May 19, 1928   2 Sheets-Sheet 2
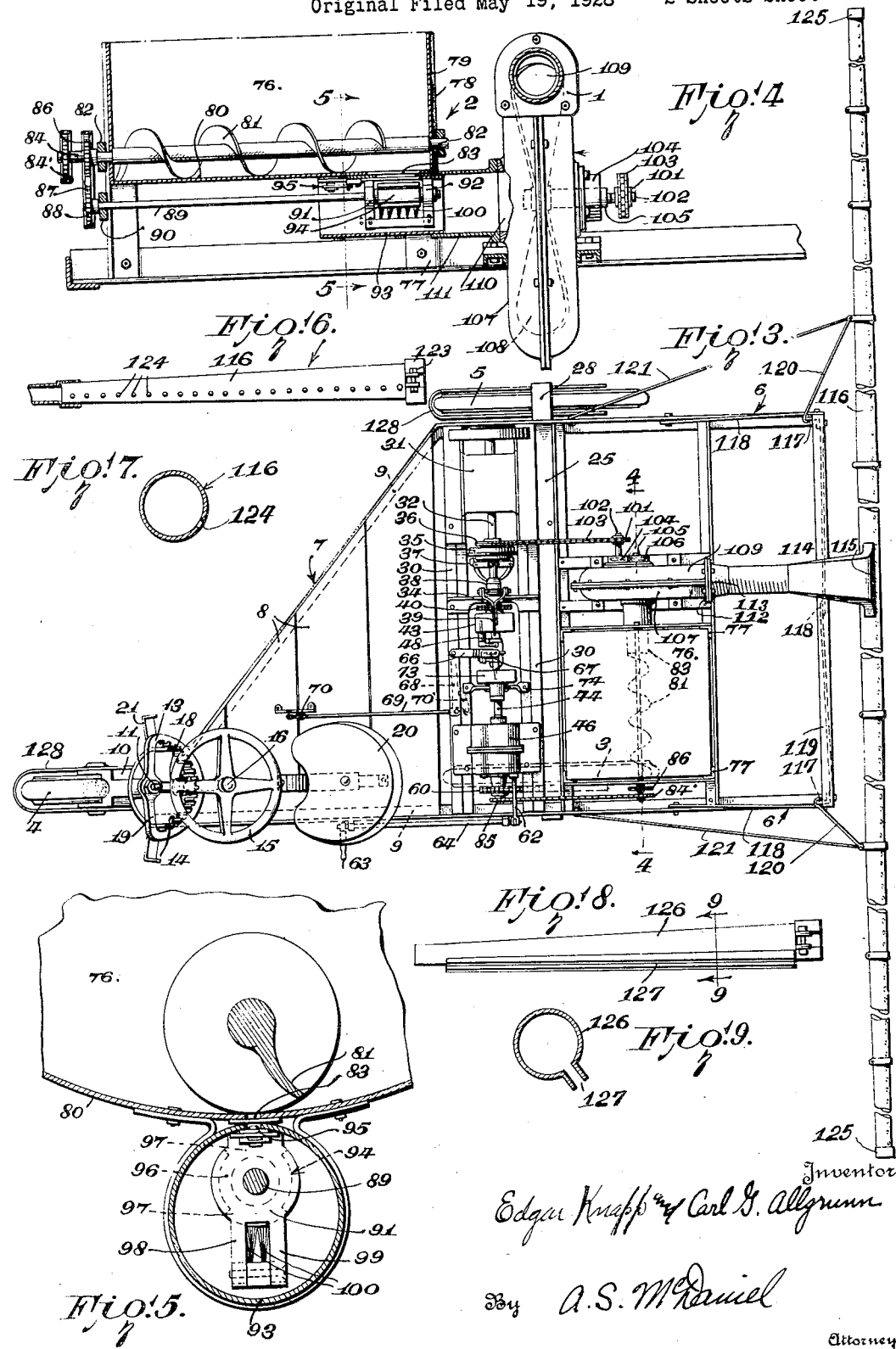
Inventor
Edgar Knapp and Carl G. Allgrunn
By A. S. McDaniel
Attorney Patented Nov. 14, 1933

1,934,718

UNITED STATES PATENT OFFICE 1,934,718

DUSTING MACHINE

Edgar Knapp and Carl G. Allgrunn, Middleport, N. Y., assignors to Niagara Sprayer Company, Middleport, N. Y., a corporation of New York Application May 19, 1928, Serial No. 279,044
Renewed February 8, 1933

7 Claims. (Cl. 43—148)

This invention relates to a machine for distributing materials, and particularly for distributing fungicides, insecticides and the like. The invention relates primarily to an apparatus for dusting fungicides and insecticides upon wheat and other small grain crops for assisting in the development of a large and a high quality grain yield to the farmer. It has been found that the usual fungicide distributing machines when used for the treatment of grain crops, damage the crops and therefore counteract to a large extent the beneficial results that would otherwise be derived from the treatment.

Enormous wheat fields are planted each year and the spread of the fungus known as "rust" now presents one of the greatest problems, if not the greatest problem, which confronts those sections of the country in which small grain vegetation constitutes the main crop.

There are at least three principal methods which appear to be more or less practical for impeding the spread of rust, and for materially overcoming the problems created thereby. Of these principal methods, we believe that the dusting of fungicides upon the vegetation can be made to have the least practical disadvantages, and therefore, aside from the other inherent advantages in the use of certain fungicidal material prepared for use in dust form, it is quite certain that the dusting of fungicides can be developed into a leading method for the control of rust on small grain crops.

It is customary to plant the small grain crops in drills of approximately seven inches apart, in order that the largest production per acre may be had, and therefore, it has been found that in the treatment of grain crops with the usual heavy machinery mounted on large ground wheels, prohibitive mechanical destruction resulted. Therefore, the use of such machines in the treatment of grain crops is considered to be absolutely impracticable. Formerly another obstacle which prevented the efficient utilization of fungicides in the treatment of grain crops, resulted from the fact that the apparatus had to be drawn by horses, and that such practice resulted in the trampling of the crops to a degree where the damage was greater than any benefit derived from the application of the fungicide.

It is an object of the present invention to overcome the difficulties formerly encountered in the treatment of grain crops with a fungicide, and the invention contemplates the employment of a self-propelled vehicle constructed in a manner which will practically eliminate any destruction of the grain crop in its passage over the field.

Another object of the present invention is the construction of a self-propelled dusting apparatus in which sufficient ground traction is had to permit the apparatus to be propelled across the field, with a minimum of additional ground-contacting mechanism.

The invention further contemplates the employment of a vehicle having a single pivotally mounted ground-engaging wheel for steering the same, the wheel being arranged directly in front of a traction wheel so that the operator, when steering the vehicle, can guide the pivoted wheel into the space between the adjacent rows of grain with the result that the traction wheel follows in the path behind the steering wheel without causing substantial damage.

The invention still further contemplates the provision of a mechanism requiring manipulation by the operator in a position where it may be moved to control the apparatus from a point directly behind the pivoted wheel, in order that the operator may guide the wheel efficiently for maintaining it between adjacent rows of grain.

It is also an object of this invention to provide the power transmission and braking mechanism upon a support, so that this mechanism may be formed into a removable unit.

An additional object of the present invention is the construction of an apparatus in which all of the power necessary for feeding the fungicide and for causing the entrainment of the same in an air blast, is derived from mechanism carried by the apparatus, in order that the only functions necessary to be performed by the ground-engaging wheels are the steering of the apparatus and the mere propulsion of the apparatus over the ground.

It is further, an object of this invention to provide an apparatus in which the treatment of a relatively wide strip of grain with respect to the width of the apparatus may be had in a single traversing of the field by the machine, with the resulting reduction in the number of trips of the machine across the field for uniformly treating the entire crop.

This invention contemplates additionally the provision of wheel fenders or shields, which cause the separation of the vegetation as the apparatus traverses the field, and which keeps the vegetation from becoming entangled with the wheels.

Other objects and advantages will be apparent upon a consideration of the following detailed description when considered in connection with the accompanying drawings wherein Figure 1 is a side elevation of the complete apparatus;

Fig. 2 is a transverse sectional view through the apparatus taken on line 2—2 of Fig. 1;

Fig. 3 is a top plan view of the complete apparatus;

Fig. 4 is a sectional view taken on line 4—4 of Fig. 3;

Fig. 5 is a detail sectional view of the feeding apparatus taken on line 5—5 of Fig. 4;

Fig. 6 is a rear view of one form of distributing pipe as it would be mounted upon the apparatus;

Fig. 7 is a transverse sectional view of the distributing pipe illustrated in Fig. 6;

Fig. 8 illustrates a modified form of distributing pipe as it would be applied to the apparatus; and Fig. 9 is a transverse sectional view through the distributing pipe shown in Fig. 8.

Now referring to the drawings in detail, the numeral 1 designates a horizontally arranged frame upon which the dusting mechanism, indicated generally at 2, is mounted. The frame is supported preferably upon three wheels, the traction wheel 3, the pivoted ground-engaging guiding wheel 4, and the idling wheel 5.

The frame 1 is formed of angle bars 6, which are joined together to provide a rectangular rear portion and a triangular forward portion. This triangular portion at the front end of the frame 1 is tapered as at 7 toward one side thereof, and the pivoted ground-engaging guiding wheel 4 is mounted to support the frame at the point of convergence. As the frame 1 is formed of angle bars the triangular portion at the front end thereof is preferably provided with a flooring constructed of boards 8 which are fitted within the vertically arranged walls of the angle bars, with the portions thereof adjacent their ends resting upon the inwardly projecting walls 9 of the angle bars and supported thereby.

The pivoted wheel 4 is mounted upon a shaft within the fork member 10, said fork member 10 having an extension 11 passing through a tubular housing 12 in which a bearing is contained. Mounted upon the extension 11 above the housing 12 is a segmental ring-section 13 provided with internally arranged gear teeth 14. A steering wheel 15 is mounted upon a steering shaft 16, and the shaft has its lower end journaled in a bearing 17 formed in an extension of the tubular housing 12. The bearing 17 is arranged with respect to the housing 12 so that a pinion 18 mounted on the shaft 16 will mesh with the internally arranged gear teeth 14 of the segmental ring section. It will, therefore, be seen that the rotation of the steering wheel 15 will result in a reduced rotary motion of the fork member 10, with the pivoted wheel 4. It is to be noted that the arrangement of the segmental ring section 13 and the pinion 18 results in a construction by which the pinion will be engaged by a bar 19 of the segmental ring section when the fork member 10 is sharply turned, which bar will constitute a stop for preventing the wheel 4 from being turned at too sharp an angle.

The frame 1 extends laterally on either side of the longitudinal plane in which the pivoted wheel 4 is arranged with respect to the apparatus, so that it is possible to provide a seat 20 for the operator directly over the boards 8 on the frame, and with the seat directly behind said pivoted wheel. Such an arrangement with the seat for the operator positioned directly behind the wheel 4, will enable him to accurately maintain the said wheel between adjacent rows of grain as the apparatus traverses the field. Furthermore, as the frame 1 extends completely under the seat, the operator may readily rest his feet upon the frame although it is preferable to provide a foot rest for the operator such as is indicated at 21.

Both the traction wheel 3 and the idler wheel 5 are mounted upon independent axles 22, which are, in turn, supported by fork members 23 and 24 respectively. Each of the fork members 23 and 24 are secured in an inverted channel bar 25, which extends entirely under the frame 1 in a transverse direction. Braces 26 are provided for maintaining the wheels 3 and 5 in proper relation to the frame 1, the traction wheel 3 being more rigidly braced than the idler wheel 5 by parallel truss rods 27 extending from the forward part of the frame 1.

As previously stated, the traction wheel 3 is mounted directly behind the pivoted wheel 4 so that the operator, upon keeping the wheel 4 between adjacent rows of grain in passing over a field, will be assured that said traction wheel is following directly in the path of the pivoted wheel 4.

The idler wheel 5 is arranged beyond the side of the frame 1, the channel bar 25, which supports the fork member 24, extending beyond the frame 1 as indicated at 28, for the purpose of supporting the fork member in this position; and the wheel 5 is so spaced from the traction wheel 3 that it will come within the space between two adjacent rows of vegetation when the traction wheel is properly guided in its travel behind the wheel 3. The traction wheel may be adjustably mounted so that if the apparatus is utilized for dusting vegetation wherein the rows are spaced differently from the normal spacing, the apparatus may be properly adjusted before the machine is driven over the field.

Each of the wheels 3, 4 and 5 is of a somewhat narrow construction, being preferably about four inches in width so that the operator will be able, with comparative ease, to maintain at least the traction wheel 3 and the pivoted wheel 4 in the space between rows of vegetation. Furthermore, each wheel, including the front pivoted wheel, has arranged thereon a rubber tire 29 to form a cushion for eliminating the crushing of vines and plants in the event the space between the rows is not well defined. Either pneumatic tires or solid rubber tires may be used, although the use of pneumatic tires is preferred because of the broad traction surface presented thereby.

It is important that the entire apparatus be maintained as light as possible, and the mechanism for propelling the apparatus over the ground has been designed and mounted so that the same motor, in addition to causing a propulsion of the apparatus over the ground, provides the power for causing a feeding of the fungicide from the hopper to the blower, and the power for creating a blast of air by which the fungicide is entrained for distribution.

In constructing the apparatus in the manner referred to above, two I-beams 30 are arranged transversely of the frame 1 with the ends thereof supported by the angle bars 6, the beams being horizontally spaced and parallel with respect to one another. The rearmost I-beam 30 is positioned just in advance of the center of the wheels 3 and 5, while the forward beam 30 is positioned across the frame in a line with the point at which the frame 1 begins converging toward the forward end.

An engine 31 preferably of the internal combustion type, is mounted upon the I-beams 30 at that side of the apparatus supported by the idler wheel 5, and the engine shaft 32 extends partially over the same to a point where it is terminated after it has passed through a bearing 33 in a support 34 secured to and bridging the space between said I-beams.

Positioned upon the engine shaft between the bearing 33 and the engine, is one member 35 of a clutch mounted for free rotary movement with respect to the shaft. This clutch member 35 has connected thereto for rotary movement therewith, a sprocket wheel 36, which, as will be more fully hereinafter explained, is employed for causing the operation of a fan. Another member 37 of the clutch is clamped to the engine shaft 32 so that it will be rotated therewith. This member 37 is arranged to cooperate with a cone member 38 as said cone member is moved longitudinally of the shaft, for causing connection of the two members 35 and 37 of the clutch, with the resultant rotation of the sprocket wheel 36 when the engine is operated. A hand lever 39 is pivoted to the support 34 at a point below the bearing 33 and this lever is adapted to cause the longitudinal movement of the cone member 38 for effecting the engagement or disengagement of the clutch.

The end of the shaft 32, which extends through the bearing 33, has mounted thereon a sprocket wheel 40 over which a sprocket chain 41 is adapted to be passed. This sprocket chain, in turn, passes over a sprocket 42 carried by a clutch member 43, which is, in turn, supported upon a shaft 44 arranged in a line but at point below the engine shaft. The shaft 44 has its end journaled in a bearing 45 arranged in the support 34, and the other end thereof passes into a housing 46 where it is supported by a bearing 47, the housing, like the engine and the support 34, being secured to and bridging the space between the I-beams 30. Mounted upon the shaft 44 for rotation therewith is a double-ended cone member 48, which is adapted to be moved longitudinally of the shaft, and upon longitudinal movement in the direction of the clutch cooperates with the member 49 thereof for effecting rotation of the shaft 44 when the engine is operated.

The end of the shaft 44 which extends into the housing 46 has arranged thereon a gear 50 for meshing with another gear 51 mounted on a stub shaft 52. This stub shaft 52 has mounted thereon two additional gears 53 and 54 respectively, the gear 53 being adapted to be engaged by a shiftable gear 55 mounted for longitudinal movement upon another stub shaft 56 for causing rotation of said shaft which will effect reverse motion of the apparatus, as will be hereinafter more fully described. The gear 54 is in constant mesh with another gear 57 which is mounted upon a stub shaft 58, and upon the shifting of the gear 55 away from the gear 53, it can be moved into mesh with the gear 57 for effecting forward movement of the apparatus.

The stub shaft 56 is in axial alignment with the shaft 44 and extends outwardly through the housing in the opposite direction, from shaft 44. Upon the outer end of the shaft 56 a sprocket wheel 59 is mounted, over which a sprocket chain 60 passes, the sprocket chain also passing over a sprocket 61 associated with the traction wheel 3 for causing the rotation thereof when the engine is operated. Mechanism for shifting the movable gear 55 to cause its engagement with either of the gears 53 or 57, is indicated at 62, the mechanism being adapted to be controlled by a rockable lever 63 arranged adjacent the driver's seat at the front of the apparatus. The lever 63 is connected to the mechanism 62 by means of a longitudinal oscillatory shaft 64 mounted along the side of the frame 1.

The clutch on the shaft 44 is adapted to be connected or disconnected by the oscillation of a vertical shaft 65, which has keyed to the upper end thereof an extension 66 of a yoke 67. The yoke 67 is connected to the double-ended cone member 48, and it will be seen therefore that the oscillation of the vertical shaft 65 causes the movement of the cone member longitudinally along the shaft 44 to a point where it cooperates with or is withdrawn out of contact with the operating mechanism attached to the clutch member 49. Keyed to the lower end of the vertical shaft 65, below the point at which it is journaled in the forward I-beam 30, is a lever 68 adapted to be oscillated by a rod 69 which is, in turn, connected to a lever 70 arranged adjacent the operator's seat 20. It will be clear that the operator may cause the oscillation of the vertical shaft 65 by means of the lever 70, with the resultant operation of the cone member 48 upon moving the lever to an appropriate position.

The lever 70 may be of the usual construction, by being pivoted to the frame 1 and having the rod 69 connected thereto above the pivot point, and the lever may likewise be of the construction whereby it can be maintained in the adjusted position by means of the usual rack bar and pin arrangement commonly employed for such purposes.

The lever 70 by being adjusted to the extreme position, opposite to the position in which the clutch members 43 and 49 are caused to engage, effects the movement of lever 68 as indicated at 70' in dotted lines on Fig. 3, and thereby causes the positioning of the cone member 48 to engage operating mechanism 71 which, in turn, results in the expansion of an internally arranged brake shoe 72 mounted for cooperation with the interior of a brake drum 73. The brake drum 73 is secured against rotary movement by means of braces 74 which are connected to the drum and to the I-beams 30. As the brake shoe 72 is keyed for turning with the shaft 44, it is obvious that the expansion thereof for engagement with the interior of the drum 73 will effect a braking action of the shaft. From the above it will be clear that when the lever 70 is moved to its forward position, the movement of the apparatus will be retarded due to the application of the braking mechanism just described, while when it is moved to the rearmost position, it will cause the cone member 48 to move through a neutral or intermediate position where the cone member does not affect either the clutching mechanism or the braking mechanism, to a position which will result in the clutch members cooperating to effect the rotation of the shaft 44.

It is well to note at this point that the I-beams 30, together with the engine 31, the clutch mechanism on the engine shaft 32, the support 34, the shaft 44 with its clutch and braking mechanisms, and the transmission housing 46, are all secured together as a unit, and that when desired this entire unit may be removed from the frame 1 when worn and replaced by a unit in proper condition merely by disconnecting the chains and rods and the I-beams 30 from the frame.

Mounted on the frame 1 directly behind the housing 46 is a hopper 76, preferably constructed in the form of a frame from vertical angle bars 77, horizontal angle bars 78, and metal plates 79. The hopper 76 is supported above the platform 1 by means of extensions of the vertical angle bars 77, so that a relatively large rounded trough-shaped bottom 80 of the hopper is arranged with its lowermost portion substantially in the same horizontal plane as the shaft 44. The hopper has arranged therein, closely adjacent the lowest portion of its bottom, a relatively small screw conveyor 81, which is mounted in bearings 82 in the sides of the hopper, and this conveyor has the end thereof terminating short of the wall toward which the material is caused to be moved in operation. The screw conveyor 81 is mounted directly above the lowermost portion of the bottom 80, and is in open communication with the entire interior of the hopper, so that as the material within the hopper settles down into the bottom thereof, it will be moved by the conveyor to a position over the opening 83 in the bottom 80, through which opening some of the material will be discharged.

Because of the construction of the conveyor 81, it being terminated short of the wall of the hopper 76, toward which the material is fed, the material within the hopper will be continuously agitated as only a limited amount of the material moved by the conveyor will be discharged through the opening 83 in the bottom 80. This movement of a relatively large amount of material will result in the excess material fed by the conveyor being forced upwardly adjacent the wall, whereupon it will tumble back upon the other material in the hopper. Therefore the material will be kept in a loose free condition within the hopper and will not be packed against the wall as it would if the conveyor extended the entire distance between the walls of the hopper.

The screw conveyor 81 has mounted on an extension 84 of its shaft, which is arranged exterior to the wall of the hopper, a sprocket wheel 84' over which passes a chain which, in turn, passes over another sprocket wheel 85 mounted on shaft 56 beyond the sprocket wheel 59, so that the conveyor shaft will be operated by the engine through the medium of shaft 44 as the apparatus is propelled over the field. Another sprocket wheel 86 is arranged on the extension 84, and a chain 87 passes over this wheel and also over a sprocket wheel 88 mounted on a shaft 89. The shaft 89 extends inwardly under the hopper 76 through a bearing 90 and has its inner end supported by bearings 91 and 92 respectively. A casing 93 is arranged directly under the opening 83 in the bottom of the hopper, and this casing contains a rotary valve member 94 which is positioned to receive material discharged through the opening.

A slide valve 95 is arranged between the bottom 80 of the hopper and the valve member 94, to effect the enlargement or reduction of the opening 83, and it therefore provides a means for controlling the amount of material which is discharged through the valve member. The valve member 94 is formed with a body 96 and outwardly extending ribs 97, and it is fixedly mounted on the shaft 89 between the bearings 91 and 92. The shaft 89 is adapted to be rotated by means of the sprocket wheel 88 through the medium of the sprocket chain 87 as the extension 84 is caused to be operated upon the rotation of the shaft 56.

Bifurcated extensions 98 and 99 are arranged below the bearings 91 and 92 respectively, and a brush 100 is supported between the lower ends thereof. The brush is supported so that it is vertically adjustable with respect to the valve member 94 to compensate for wear. The bristles of the brush contact with the valve member 94, and as the valve is rotated for feeding material from the hopper, the material will be dislodged from the space between the ribs of the valve so that, upon the next revolution of the valve member, a full charge of the powdered material will be received from the hopper.

The engine shaft 32, as previously stated, has a sprocket wheel 36 mounted thereon, which is attached to the clutch member 35. This wheel 36 cooperates to cause the rotation of another sprocket wheel 101 mounted on a shaft 102, through the medium of a chain 103. The shaft 102 extends into a housing 104, wherein step-up gearing not shown is provided for rotating a shaft 105. The shaft 105 is journaled in a bearing 106 and extends inwardly therefrom into a fan casing 107. This fan casing 107 is preferably made in sections so that it can be separated to permit the replacement or adjustment of parts, and it has mounted therein a fan 108 for creating an air blast.

The blast of air created by the fan 108 is directed outwardly through a tangential passage 109 arranged in the upper part of the fan casing 107, the powdered material being entrained in the air as it is violently forced through the fan casing and out of the tangential passage.

At this point it is well to note that the internal combustion engine 31 is geared to the fan shaft 105 through step-up gearing and that, therefore, the fan will be operated rapidly even when the engine is running at a relatively low speed. It will also be noted that the powder feeding mechanism is operated by the shaft which causes the rotation of the traction wheel 3 for propelling the apparatus, so that the feed mechanism is operated by the engine 31. Therefore, by connecting the fan 108 so that it is operated directly from the engine shaft 32, the blast of air created will be of a large volume regardless of the fact that the apparatus may be propelled at a slow speed due to the reduction gearing illustrated, while the material to be distributed will be fed from the hopper at a rate corresponding to the ground which the vehicle is caused to traverse by the engine.

The casing 107 at the outer end of the passageway 109 is provided with a flange 112, and a flange 113 is provided on a conduit 114, by which this conduit may be bolted to the flange 112 for providing an extension of the passageway. The conduit 114 is flared in a direction transverse to the apparatus so that an elongated passageway is provided by the conduit at the point indicated at 115, where the conduit leads into a sectional distributing pipe 116.

To accommodate the distributing pipe, its supporting mechanism and the conduit 114, the hopper 76 and the mechanism for feeding the material and for creating the air blasts are positioned closely behind the rearmost I-beam 30, in order that that portion of the frame 1 which extends outwardly behind the hopper and fan casing may be utilized by arranging an upright bar 117 in each of the rear corners of the frame. The upright bars 117 are maintained in position by angularly disposed braces 118, and by a bar 119 which bridges the space between the ends of these upright bars. As the distributing pipe 116 is made up of a plurality of sections, and in its made-up form is approximately 33 ft. in length, rods 120 leading from the upper ends of bars 117 are connected to the distributing pipe at points outwardly disposed from each respective bar 117, so that the tendency of the rather light weight distributing pipe to be forced out of position or sag is eliminated. Although the supporting rods 120 maintain the distributing pipe comparatively rigid and properly positioned, it is preferable to employ horizontally arranged brace rods 121 which extend from a point on the frame 1 at each side thereof directly behind the rearmost I-beam 30 to points on the distributing pipe adjacent the points at which the rods 120 are connected thereto. These rods 121 will greatly assist in maintaining the distributing pipe in the proper position.

To provide for the attaching of the sections of the distributing pipe 116 to one another, each section at its largest end, the entire pipe tapering from the center toward each end, is provided with a clamp which is adapted to be drawn tightly into engagement with the section over which it is fitted. The clamp is drawn into tight engagement with the adjacent section by means of a bolt 123.

Each of the sections of the distributing pipe 116 is provided on the rear underside thereof with a plurality of openings 124, through which the powder may be forced by the blast of air in which it is entrained. These openings 124 are arranged in a line, the openings in each of the sections being positioned at the same angle from the vertical for the purpose of distributing the material uniformly. The end of the smallest section, this being the outer section on each end of the distributing pipe, is provided with a perforated cap 125 through which some of the powdered material is broadcast for a relatively short distance, it being contemplated that the use of the distributing pipe arranged just above the vegetation being treated, will eliminate the necessity of the scattering of materials usually known as "broadcasting". The usual broadcasting of materials results in large losses due to the wind, and these losses will be overcome by distributing the material in accordance with the present invention, as the distributing pipe conducts the material in close proximity to the vegetation to be treated before the material is discharged therefrom.

In Figure 8 of the drawings we have illustrated a modification of the distributing pipe, the modification being sufficiently illustrated by the section designated as 126. In this modification, each section 126 is provided along one side thereof, at a point corresponding to the row of the openings 124 in the pipe 116, with an elongated slot 127 through which the powder is adapted to be discharged in the same manner as the powder is discharged through the openings 124.

It has been found that by having the openings 124 and the slots 127 in the distributing pipes on the lower portion of the same and slightly to the rear, that the material will be so discharged that it will be directed against the full body of the vegetation without serious obstruction from surrounding vegetation, such as would be encountered if the material was discharged horizontally from the rear. Furthermore, as a result of this manner of discharge, there is little loss of the material on the ground as would result if the material was directed straight downwardly; and the force of discharge, close proximity to the vegetation being treated, and the angle of discharge of the material from the distributing pipe, causes much of the material to tightly adhere to the vegetation.

Attached to the fork associated with each of the wheels 3, 4, and 5, is a shield designated generally at 128. The shield is closed and preferably pointed at its forward end, so that as the apparatus is propelled over the field, the vegetation, if it be of a height which would ordinarily become entangled or damaged by the wheels, will be separated. As the shields separate the vegetation the wheels and fork members pass therebetween, whereupon the vegetation is then permitted to close behind each wheel without having been damaged.

The shield 128 for the idler wheel 5 is provided with a slot 129 in the inner wall thereof, whereby this shield may be moved downwardly into operative position with the connection between the fork 24 and the brace 26 arranged within the slot. After the shield for wheel 5 is placed in operative position, the inner wall thereof is bolted to the inner arm of the fork for maintaining the shield against displacement.

The shield 128 for the traction wheel 3 is extended at the upper front portion thereof as indicated at 130, so that it will accommodate the forwardly extending truss rods 27, to which rods it is secured. This shield is secured to the brace 26 in addition to being secured to the truss rod 27.

In utilizing the apparatus for the dusting of fungicides upon vegetation, the hopper 76 has the material to be dusted deposited therein, the engine is started which will cause the fan to be operated for creating a blast of air with a resultant discharge through the openings in the distributing pipe 116 or 126, as the case may be. The operator then places the vehicle in gear by moving the lever 63, and he thereafter effects engagement of the clutch members 43 and 49, whereby the vehicle is propelled by the engine over the field. The feeding mechanism is caused to operate through the chain and sprocket arrangement previously described, whereby the powder is fed downwardly into the casing 93 and is then commingled with the inrushing air and caused by the fan 108 to be discharged through the openings in the distributing pipe.

If it is desired to deposit a larger or smaller amount of powder upon the ground or vegetation, the slide valve 95 is adjusted so that the opening 83 is reduced or enlarged according to the rate of feed of the material desired.

While the apparatus has been described particularly in connection with its use for the treatment of small grain crops, it is obvious that because of the fact that only a single engine is employed and because of the general lightness of the construction, that the apparatus is well adapted for the treatment of vegetation such as potatoes, cucumbers and the like, or by the mere substitution of other suitable types of dust distributing conduits and pipes, preferably flexible, for those shown in the drawing which lead from the outlet of the blower casing 107, the device as a whole may be readily adapted for use in the dusting of vegetation of greater height than that just specified, including fruit trees and the like.

In using the present apparatus, it has been found that there is very little mechanical damage done to the vegetation during the treatment thereof, and that the rubber tires aid materially in this respect.

What we claim is:

1. In a portable apparatus for discharging finely divided material, means for feeding measured amounts of material, means for forcibly discharging said material, and means for propelling the apparatus over the ground, the means for propelling the apparatus and the means for measuring amounts of material being actuated from a single source of power and constant with respect to the speed of each other, and means for varying the amount of material being fed by the feeding means without affecting the speed of actuation of such means, whereby the amount of material fed by the feeding means may be varied with respect to the ground over which the device is propelled.

2. In a portable machine for distributing fungicides and the like upon vegetation, a body and mechanism arranged thereon for distributing the material, supporting wheels for the body, one of the supporting wheels being pivotally mounted with respect to the body for permitting guiding of the same, a seat for the operator positioned directly behind said wheel, and a traction wheel in the same longitudinal plane as the guiding wheel and the wheel adapted to be rotated for propelling the machine over the ground, the seat and pivotally mounted wheel being positioned in such manner as to permit a clear view from the seat to the ground immediately ahead of the pivotally mounted wheel.

3. In a portable machine for distributing fungicides and the like upon vegetation, a frame, wheels upon which the frame is supported, a shield extending at least around the forward portion of one of the wheels for causing a separation of the vegetation as the machine is propelled through the same, whereby substantial mechanical damage due to entanglement of the vegetation with the wheel is eliminated.

4. In a portable machine for distributing fungicides and the like upon vegetation, a frame, wheels upon which the frame is supported including at least one traction wheel, power means mounted upon the frame for causing the rotation of the traction wheel for propelling the machine over the ground, and a shield extending around the forward portion of the traction wheel for causing a separation of the vegetation as the wheel passes through the same, whereby substantial mechanical damage due to entanglement of the vegetation with the wheel is eliminated.

5. In a machine for distributing powdered material, a hopper provided with an opening in the bottom thereof, a valve for changing the effective size of said opening, means for creating a blast of air and for entraining the material within the air after it has been discharged from the hopper and for effecting distribution thereof, means within the hopper for feeding the material toward said opening, said means acting upon the material within the hopper throughout only a portion of the width thereof, whereby the material which is fed toward the opening in excess of the amount of material which passes therethrough is forced upwardly within the hopper and permitted to tumble backwardly upon the remainder of the material therein.

6. In a portable machine for distributing fungicides and the like upon vegetation, a frame, wheels for supporting the frame including rear wheels the axles of which are in axial alignment mounted on opposite sides of the frame, distributing mechanism carried by the frame for distributing the fungicide, a unit mounted upon the frame at a point in advance of the axles of the rear wheels comprising an engine, transmission mechanism and clutching mechanism, the unit being adapted to be removed and replaced without affecting the permanent association of the distributing mechanism, means for connecting the transmission with at least one of the rear wheels for propelling the machine over the ground, and means for effecting distribution of the material by power derived from the engine, whereby the weight of the unit is in advance of the rear wheels which will aid in maintaining the machine evenly upon the ground.

7. In a machine for distributing powdered material, a hopper provided with an opening in the bottom thereof, a valve for changing the effective size of said opening, means disposed on the outlet side of said opening for periodically receiving and discharging measured amounts of material after it passes the opening, means for creating a blast of air and for entraining the material within the air after it has been discharged from the hopper and for effecting distribution thereof, means within the hopper for feeding the material toward said opening, said means acting upon the material within the hopper throughout only a portion of the width thereof, whereby the material which is fed toward the opening in excess of the amount of material which passes therethrough is forced upwardly within the hopper and permitted to tumble backwardly upon the remainder of the material therein.

EDGAR KNAPP.
CARL G. ALLGRUNN.